(12) United States Patent
Kim et al.

(10) Patent No.: US 12,208,541 B2
(45) Date of Patent: Jan. 28, 2025

(54) DICING BLADE INCLUDING DIAMOND PARTICLES

(71) Applicant: SAMSUNG ELECTRONICS CO., LTD., Suwon-si (KR)

(72) Inventors: Youngja Kim, Cheonan-si (KR); Hyunggil Baek, Suwon-si (KR); Younhwan Shin, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 435 days.

(21) Appl. No.: 17/746,454

(22) Filed: May 17, 2022

(65) Prior Publication Data

US 2023/0039736 A1    Feb. 9, 2023

(30) Foreign Application Priority Data

Aug. 4, 2021   (KR) .......................... 10-2021-0102611

(51) Int. Cl.
*B28D 5/02*   (2006.01)
*C01B 32/25*   (2017.01)

(52) U.S. Cl.
CPC .............. *B28D 5/022* (2013.01); *C01B 32/25* (2017.08)

(58) Field of Classification Search
None
See application file for complete search history.

(56) References Cited

U.S. PATENT DOCUMENTS

| 6,641,381 | B2 | 11/2003 | Ball |
| 7,124,753 | B2 | 10/2006 | Sung |
| 8,757,134 | B2 | 6/2014 | Kim et al. |
| 2020/0368856 | A1 | 11/2020 | Chu et al. |

FOREIGN PATENT DOCUMENTS

| KR | 10-0231087 | 8/1999 |
| KR | 10-2001-0003739 | 1/2001 |
| KR | 10-2021-0026901 | 9/2019 |

*Primary Examiner* — Anthony Ho
(74) *Attorney, Agent, or Firm* — F. CHAU & ASSOCIATES, LLC

(57) ABSTRACT

A dicing blade includes: a first blade portion and a second blade portion at least partially surrounding the first blade portion, wherein the first blade portion includes: a first bonding layer; first diamond particles disposed in the first bonding layer and having a first density in the first bonding layer; and first metal particles disposed in the first bonding layer, and wherein the second blade portion includes: a second bonding layer at least partially surrounding the first bonding layer; and second diamond particles disposed in the second bonding layer and having a second density in the second bonding layer, wherein the second density is higher than the first density.

20 Claims, 17 Drawing Sheets

DICING BLADE INCLUDING DIAMOND PARTICLES

CROSS-REFERENCE TO RELATED APPLICATION

This application claims priority under 35 U.S.C. § 119 to Korean Patent Application No. 10-2021-0102611, filed on Aug. 4, 2021, in the Korean Intellectual Property Office, the disclosure of which is incorporated by reference herein in its entirety.

TECHNICAL FIELD

The present inventive concept relates to a dicing blade, and more particularly, to a dicing blade including diamond particles.

DISCUSSION OF THE RELATED ART

Generally, a process of manufacturing a semiconductor device may include a process of individualizing a semiconductor material applied during manufacturing of the semiconductor device. For example, in an individualization process for a semiconductor device, typically, a dicing blade may be used to individualize the semiconductor device by mechanically grinding scribe lanes formed in the semiconductor device. When the dicing blade is used repeatedly for grinding, a portion of the dicing blade may wear down and uneven wear of the dicing blade may occur too. In addition, when semiconductor devices are individualized using the worn blade, a size difference between the individualized semiconductor devices may occur.

SUMMARY

According to an exemplary embodiment of the present inventive concept, a dicing blade includes: a first blade portion and a second blade portion at least partially surrounding the first blade portion, wherein the first blade portion includes: a first bonding layer; first diamond particles disposed in the first bonding layer and having a first density in the first bonding layer; and first metal particles disposed in the first bonding layer, and wherein the second blade portion includes: a second bonding layer at least partially surrounding the first bonding layer; and second diamond particles disposed in the second bonding layer and having a second density in the second bonding layer, wherein the second density is higher than the first density.

According to an exemplary embodiment of the present inventive concept, a dicing blade including: a first blade portion and a second blade portion at least partially surrounding the first blade portion, wherein the first blade portion includes: a first bonding layer; first diamond particles disposed in the first bonding layer; and first metal particles disposed in the first bonding layer and having a first density in the first bonding layer, and the second blade portion includes: a second bonding layer at least partially surrounding the first bonding layer; and second diamond particles disposed in the second bonding layer.

According to an exemplary embodiment of the present inventive concept, a dicing blade including: a first blade portion and a second blade portion at least partially surrounding the first blade portion. The first blade portion includes: a first bonding layer including at least one of carbon (C), oxygen (O), copper (Cu), or tin (Sn); first metal particles having a first density in the first bonding layer, wherein each of the first metal particles includes at least one of nickel (Ni), titanium (Ti), or tungsten (W); and first diamond particles disposed in the first bonding layer and having a second density in the first bonding layer. The second blade portion includes: a second bonding layer at least partially surrounding the first bonding layer and including at least one of C, O, Cu, or Sn; second metal particles having a third density in the second bonding layer, wherein the third density is lower than the first density, wherein each of the second metal particles includes at least one of Ni, Ti, or W; and second diamond particles disposed in the second bonding layer and having a fourth density higher in the second bonding layer, wherein the fourth density is lower than the second density.

BRIEF DESCRIPTION OF THE DRAWINGS

The above and other aspects of the present inventive concept will become more apparent by describing in detail embodiments thereof, with reference to the accompanying drawings, in which.

DETAILED DESCRIPTION OF THE EMBODIMENTS

Hereinafter, exemplary embodiments of the present inventive concept will be described in detail with reference to the accompanying drawings.

Figure 1:
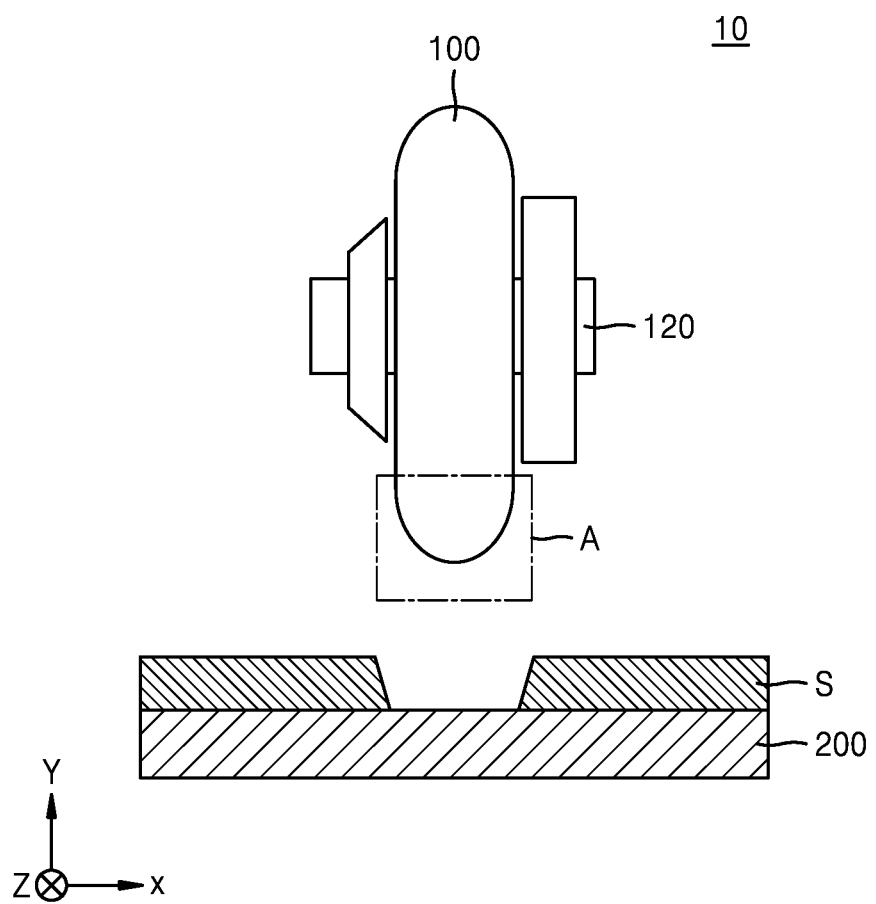
FIG. 1 is a diagram illustrating a process of individualizing semiconductor devices using a dicing apparatus according to an exemplary embodiment of the present inventive concept.

FIG. 1 is a diagram illustrating a process of individualizing a semiconductor device S by using a dicing apparatus 10 according to an exemplary embodiment of the present inventive concept.

According to an exemplary embodiment of the present inventive concept, the dicing apparatus 10 may be an apparatus configured to individualize, divide or cut the semiconductor device S seated on a chuck plate 200. For example, the dicing apparatus 10 may individualize the semiconductor device S by mechanically grinding scribe lanes formed in the semiconductor device S as a dicing blade 100 rotates.

In an exemplary embodiment of the present inventive concept, the semiconductor device S on the chuck plate 200 may be a semiconductor package including semiconductor elements, or a semiconductor substrate such as a printed circuit board (PCB). However, exemplary embodiments of the present inventive concept are not limited thereto, and the semiconductor device S may be a wafer including semiconductor elements.

In an exemplary embodiment of the present inventive, the dicing apparatus 10 may include a rotation shaft 120 and a dicing blade 100. The rotation shaft 120 is configured to rotate about an axis extending in a first direction X, and the dicing blade 100 is coupled to the rotation shaft 120 and configured to cut at least a portion of the semiconductor device S while rotating.

The rotation shaft 120 of the dicing apparatus 10 may have a rod shape extending in the first direction X or a cylindrical shape, and may be configured to rotate about the axis extending in the first direction X. For example, the rotation shaft 120 may be configured to rotate due to power provided by a motor.

In addition, the dicing blade 100 of the dicing apparatus 10 may be coupled to the rotation shaft 120 and configured to rotate based on rotation of the rotation shaft 120. For example, the dicing blade 100 may have a coupling hole in a central portion thereof, and the rotation shaft 120 may be disposed in the coupling hole and coupled thereto.

In an exemplary embodiment of the present inventive concept, the dicing blade 100 may be configured to cut at least a portion of the semiconductor device S as the dicing blade 100 rotates. For example, the dicing blade 100 may individualize the semiconductor device S by mechanically grinding scribe lanes formed in the semiconductor device S.

In an exemplary embodiment of the present inventive concept, the dicing blade 100 may have a disk shape when viewed in a plane (Y-Z plane) perpendicular to the first direction X.

Hereinafter, the dicing blade 100 of the dicing apparatus 10 according to an exemplary embodiment of the present inventive concept will be described in more detail with reference to the drawings.

Figure 2:
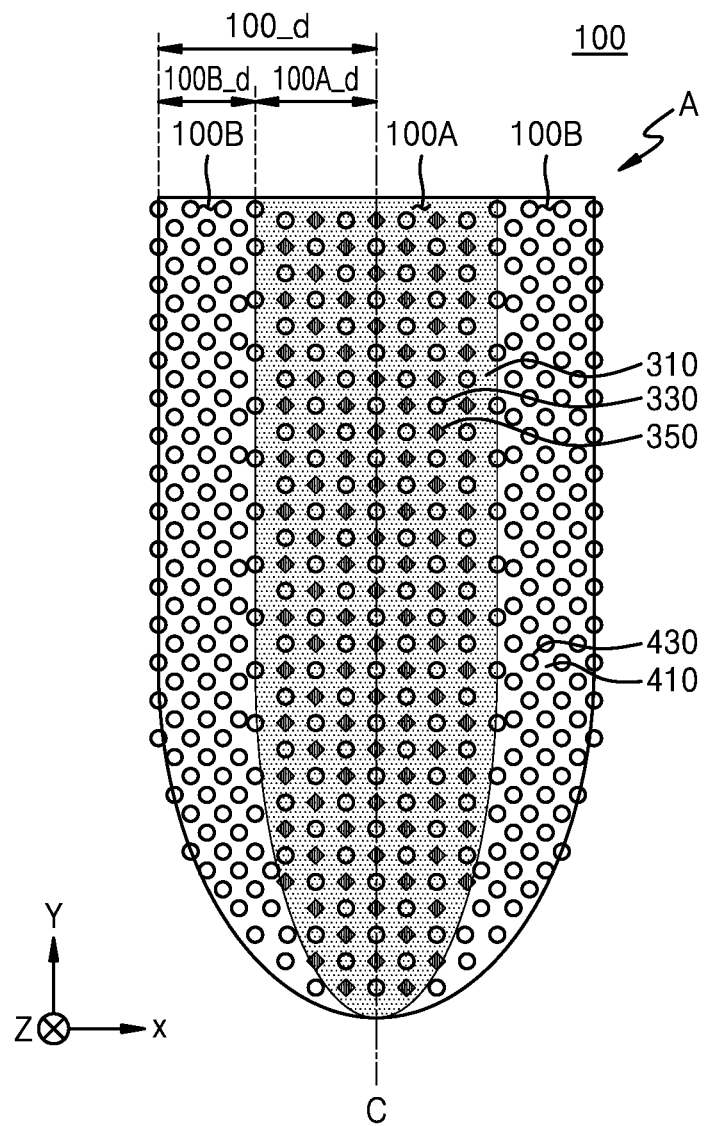
FIG. 2 is an enlarged cross-sectional view of an area A in FIG. 1, and in particular, a cross-sectional view of a dicing blade according to an exemplary embodiment of the present inventive concept.

FIG. 2 is a cross-sectional view of the dicing blade 100 according to an exemplary embodiment of the present inventive concept. For example, FIG. 2 may be a cross-sectional view of an area A in FIG. 1.

Referring to FIG. 2, the dicing blade 100 may include a first blade portion 100A and a second blade portion 100B at least partially surrounding the first blade portion 100A. For example, the second blade portion 100B may completely surround the first blade portion 100A.

A lower portion of the dicing blade 100 according to an exemplary embodiment of the present inventive concept may have a tapered shape with a length in a direction parallel to the first direction X decreasing as the distance from the rotation shaft 120 increases. For example, when the dicing blade 100 is viewed in an X-Y plane, a cutting surface of the dicing blade 100 that is in contact with the semiconductor device (S of FIG. 1) may be round.

The first blade portion 100A may be a central portion of the dicing blade 100. Furthermore, the second blade portion 100B may be an edge portion or a peripheral portion of the dicing blade 100 at least partially surrounding the first blade portion 100A.

Hereinafter, a central axis C of the dicing blade 100 may be an imaginary line extending in the second direction Y to pass through a center of the dicing blade 100. In an exemplary embodiment of the present inventive concept, a length 100_d of the dicing blade 100 in the first direction X may be a length extending in the first direction X from the central axis C to a side surface of the dicing blade 100 (e.g., a side surface of the second blade portion 100B). In addition, a length 100A_d of the first blade portion 100A in the first direction X may be a length extending in the first direction X from the central axis C to a side surface of the first blade portion 100A, and a length 100B_d of the second blade portion 100B in the first direction X may be a length extending in the first direction X from the side surface of the first blade portion 100A to the side surface of the second blade portion 100B.

In an exemplary embodiment of the present inventive concept, when the dicing blade 100 is viewed in the X-Y plane, a cross-sectional area of the first blade portion 100A may be about 30% to about 60% of a total cross-sectional area of the dicing blade 100. Furthermore, a cross-sectional area of the second blade portion 100B may be about 40% to about 70% of the total cross-sectional area of the dicing blade 100. For example, when the cross-sectional area of the first blade portion 100A is about 55% of the total cross-sectional area of the dicing blade 100, the cross-sectional area of the second blade portion 100B may be about 45% of the total cross-sectional area of the dicing blade 100.

In an exemplary embodiment of the present inventive concept, the length 100_d of the dicing blade 100 in the first direction X may be about 75 micrometers (μm) to about 150 μm. For example, a width of the dicing blade 100 may be about 150 to about 300 μm. However, the length 100_d of the dicing blade 100 in the first direction X is not limited to the above description.

In an exemplary embodiment of the present inventive concept, the length 100A_d of the first blade portion 100A in the first direction X may be about 30% to about 60% of the length 100_d of the dicing blade 100 in the first direction X. In addition, the length 100B_d of the second blade portion 100B in the first direction X may be about 40% to about 70% of the length 100_d of the dicing blade 100 in the first direction X. For example, when the length 100A_d of the first blade portion 100A in the first direction X is about 65% of the length 100_d of the dicing blade 100 in the first direction X, the length 100B_d of the second blade portion 100B in the first direction X may be about 35% of the length 100_d of the dicing blade 100 in the first direction X.

The first blade portion 100A may include a first bonding layer 310, first diamond particles 330, and metal particles 350.

The first bonding layer 310 may be a layer that extends in a second direction Y to form a central portion of the dicing blade 100. Furthermore, when the first bonding layer 310 is viewed in the Y-Z plane, the first bonding layer 310 may be provided in a disk shape or circular shape.

The first bonding layer 310 may be a layer configured to fix the first diamond particles 330 and the metal particles 350 to the dicing blade 100, as described below. In an exemplary embodiment of the present inventive concept, the first bonding layer 310 may include at least one of carbon (C), oxygen (O), copper (Cu), and/or tin (Sn). For example, the first bonding layer 310 may be a mixture including C, O, Cu, and Sn.

A plurality of first diamond particles 330 may be provided and arranged in the first bonding layer 310. Furthermore, some of the first diamond particles 330 may protrude from a surface of the first bonding layer 310. The first diamond particles 330 protruding from the surface of the first bonding layer 310 may be configured to cut the semiconductor device S.

Hereinafter, a density of the first diamond particles 330 may refer to a degree of concentration of the first diamond particles 330 in the first bonding layer 310. For example, the expression 'the density of the first diamond particles 330 is relatively high' may have substantially the same meaning as the expressions 'a distance between adjacent first diamond particles 330 is relatively narrow' and 'a volume proportion occupied by the first diamond particles 330 in the first bonding layer 310 is relatively large'.

In an exemplary embodiment of the present inventive concept, the first diamond particles 330 in the first bonding layer 310 may have a lower density than that of second diamond particles 430 in the second bonding layer 410 as described later. For example, the degree of concentration of the first diamond particles 330 in the first bonding layer 310 may be lower than a degree of concentration of the second diamond particles 430 in a second bonding layer 410.

For example, a distance created between adjacent ones of the first diamond particles 330 in the first bonding layer 310 may be greater than a distance created between adjacent ones of the second diamond particles 430 in the second bonding layer 410.

Furthermore, a volume proportion occupied by the first diamond particles 330 in the first bonding layer 310 may be less than a volume proportion occupied by the second diamond particles 430 in the second bonding layer 410.

In an exemplary embodiment of the present inventive concept, the volume proportion occupied by the first diamond particles 330 in the first bonding layer 310 may be about 3% to about 45%. For example, the volume proportion occupied by the first diamond particles 330 in the first bonding layer 310 may be in a range of about 3% to about 45%, and may be less than the volume proportion occupied by the second diamond particles 430 in the second bonding layer 410.

When the volume proportion occupied by the first diamond particles 330 is less than 3%, the capability of cutting with the first diamond particles 330 in the first blade portion 100A may be reduced, and the durability of the first blade portion 100A may be deteriorated.

Furthermore, when the dicing blade 100 is used repeatedly, some of the first diamond particles 330 protruding from the surface of the dicing blade 100 may be removed. In addition, as a portion of the first bonding layer 310 is removed, other first diamond particles 330 arranged in the dicing blade 100 may be newly protruding first diamond particle 330 from the surface of the dicing blade 100. Accordingly, the dicing blade 100 may individualize the semiconductor device S via the newly protruding first diamond particles 330. For example, the above-described characteristics of the dicing blade 100 may be referred to as a reproducibility of the dicing blade 100.

When the volume proportion occupied by the first diamond particles 330 exceeds 45%, the regenerative power of the dicing blade 100 may be deteriorated. For example, even though a portion of the first bonding layer 310 is removed, the first diamond particles 330 arranged in the first bonding layer 310 may be blocked by their adjacent first diamond particles 330 and the metal particles 350 and thus they may be prevented from protruding from the surface of the first bonding layer 310. Accordingly, the cutting capability of the dicing blade 100 may be reduced.

A plurality of metal particles 350 may be provided and arranged in the first bonding layer 310. The metal particles 350 may be particles of a metal material configured to increase the durability of the first bonding layer 310.

In an exemplary embodiment of the present inventive concept, the metal particles 350 may include at least one of nickel (Ni), titanium (Ti), and/or tungsten (W). As the metal particles 350 are arranged in the first bonding layer 310, the durability of the first blade portion 100A may be increased. For example, due to increased durability of the first blade portion 100A, wear of the first blade portion 100A may be reduced during a process of individualizing the semiconductor device S by using the dicing blade 100.

In an exemplary embodiment of the present inventive concept, a volume proportion occupied by the metal particles 350 in the first bonding layer 310 may be about 10% to about 30%. However, the volume proportion occupied by the metal particles 350 is not limited to the above-described numerical values.

The second blade portion 100B may include the second bonding layer 410 and the second diamond particles 430.

The second bonding layer 410 may be a layer that extends in the second direction Y to surround the first bonding layer 310 and form an edge portion (or, e.g., a peripheral portion) of the dicing blade 100. Furthermore, when the second bonding layer 410 is viewed in the Y-Z plane, the second bonding layer 410 may be provided in a disk shape or a cylindrical shape.

The second bonding layer 410 may be a layer on which the second diamond particles 430 may be fixed, as described below. In an exemplary embodiment of the present inventive concept, the second bonding layer 410 may include at least one of C, O, Cu, and/or Sn. For example, the first bonding layer 310 may be a mixture of C, O, Cu, and Sn.

In an exemplary embodiment of the present inventive concept, materials of the second bonding layer 410 may be substantially the same as those of the first bonding layer 310.

A plurality of second diamond particles 430 may be provided and arranged in the second bonding layer 410. Furthermore, some of the second diamond particles 430 may protrude from a surface of the second bonding layer 410. The second diamond particles 430 protruding from the surface of the second bonding layer 410 may be configured to cut the semiconductor device S.

In an exemplary embodiment of the present inventive concept, the density of the second diamond particles 430 in the second bonding layer 410 may be higher than the density of the first diamond particles 330 in the first bonding layer 310. For example, the degree of concentration of the second diamond particles 430 in the second bonding layer 410 may be higher than a degree of concentration of the first diamond particles 330 in the first bonding layer 310. For example, the number of second diamond particles 430 per unit of area in the second bonding layer 410 may be larger than the number of first diamond particles 330 per unit of area in the first bonding layer 310.

For example, a distance created between adjacent ones of the second diamond particles 430 in the second bonding layer 410 may be less than a distance created between adjacent ones of the first diamond particles 330 in the first bonding layer 310.

Furthermore, the volume proportion occupied by the second diamond particles 430 in the second bonding layer 410 may be greater than the volume proportion occupied by the first diamond particles 330 in the first bonding layer 310.

In an exemplary embodiment of the present inventive concept, in a process of individualizing a semiconductor device by using a dicing blade, stress may concentrate on an edge portion or peripheral portion of the dicing blade, so that the edge portion or peripheral portion of the dicing blade may wear down faster than a central portion thereof.

According to an exemplary embodiment of the present inventive concept, because the density of the second diamond particles 430 in the second blade portion 100B of the dicing blade 100 may be higher than that of the first diamond particles 330 in the first blade portion 100A, durability of the edge portion of the dicing blade 100 may be increased. Accordingly, the edge portion or peripheral portion of the dicing blade 100 may be suppressed from wearing faster than the central portion thereof.

In an exemplary embodiment of the present inventive concept, the volume proportion occupied by the second diamond particles 330 in the second bonding layer 410 may be about 5% to about 50%. For example, the volume proportion occupied by the second diamond particles 430 in the second bonding layer 410 may be in a range of about 5% to about 50%, and may be greater than the volume proportion occupied by the first diamond particles 330 in the first bonding layer 310.

When the volume proportion occupied by the second diamond particles 430 is less than about 5%, the capability of cutting with the second diamond particles 430 in the second blade portion 100B may be reduced. Furthermore, an edge portion or peripheral portion of the second blade portion 100B may wear down faster than a central portion thereof. For example, durability of the second blade portion 100B may be reduced.

When the volume proportion occupied by the second diamond particles 430 exceeds about 50%, the regenerative power of the dicing blade 100 may be deteriorated. For example, even though a portion of the second bonding layer 410 is removed, the second diamond particles 430 arranged in the second bonding layer 410 may be blocked by their adjacent second diamond particles 430 and thus they may be prevented from protruding from the surface of the second bonding layer 410. Accordingly, the cutting capability of the dicing blade 100 may be reduced.

The second blade portion 100B might not include the metal particles 350 included in the first blade portion 100A. Thus, the second blade portion 100B may have a lower stiffness than that of the first blade portion 100A.

According to an exemplary embodiment of the present inventive concept, because the first blade portion 100A of the dicing blade 100 may include the metal particle 350, the durability of the first blade portion 100A may be increased. Thus, in the process of individualizing the semiconductor device S by using the dicing blade 100, the wear of the first blade portion 100A may be reduced.

Furthermore, because the density of the first diamond particles 330 in the first blade portion 100A may be lower than the density of the second diamond particles 430 in the second blade portion 100B, the regenerative power of the first blade portion 100A may be increased. In addition, as the regenerative power of the first blade portion 100A is increased, the cutting capability of the dicing blade 100 may also be increased.

According to an exemplary embodiment of the present inventive concept, because the density of the second diamond particles 430 in the second blade portion 100B of the dicing blade 100 may be greater than that of the first diamond particles 330 in the first blade portion 100A, the cutting capability of the dicing blade 100 using the second blade portion 100B may be increased.

In addition, because the second blade portion 100B of the dicing blade 100 might not include the metal particles 350, when a portion of the second bonding layer 410 is removed due to wear, new second diamond particles 430 may easily protrude from the surface of the second bonding layer 410. For example, the regenerative power of the second blade portion 100E may be increased, and thus, the cutting capability of the edge portion of the dicing blade 100 may be increased.

Figure 3:
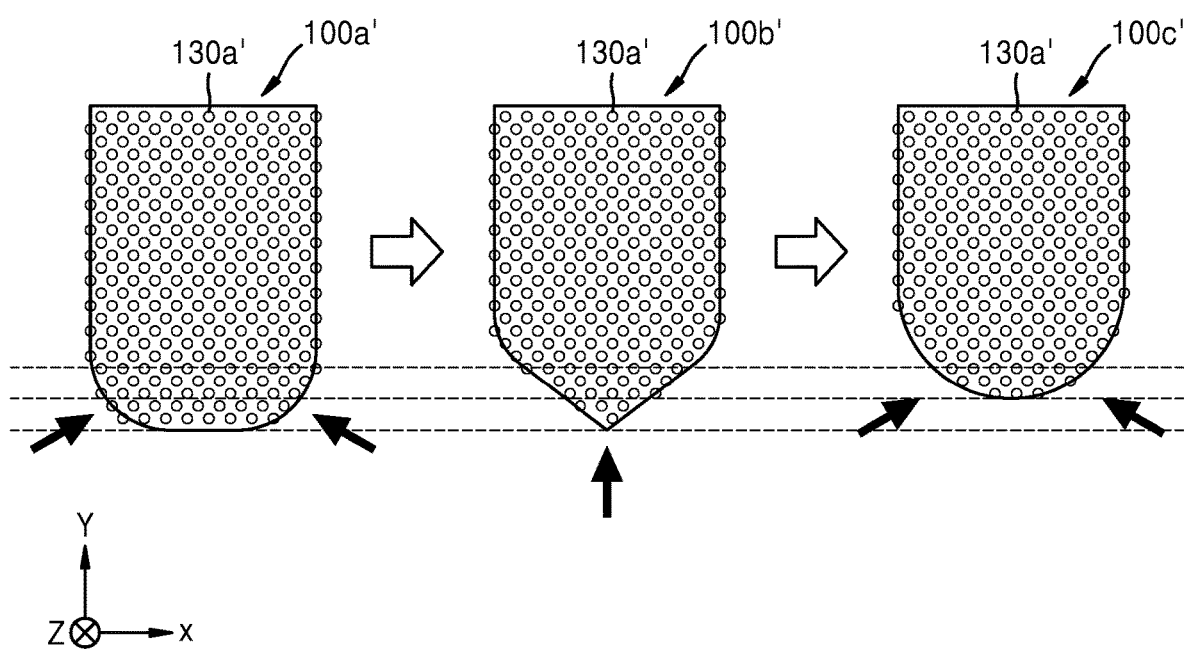
FIG. 3 is a diagram illustrating a wear process for a dicing blade according to a comparative example.
Figure 4A:
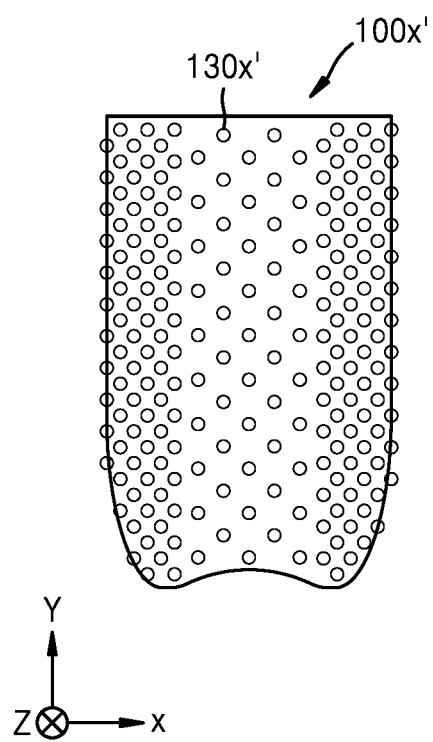
FIGS. 4A and 4B are diagrams illustrating cross-sections of dicing blades according to comparative examples.
Figure 4B:
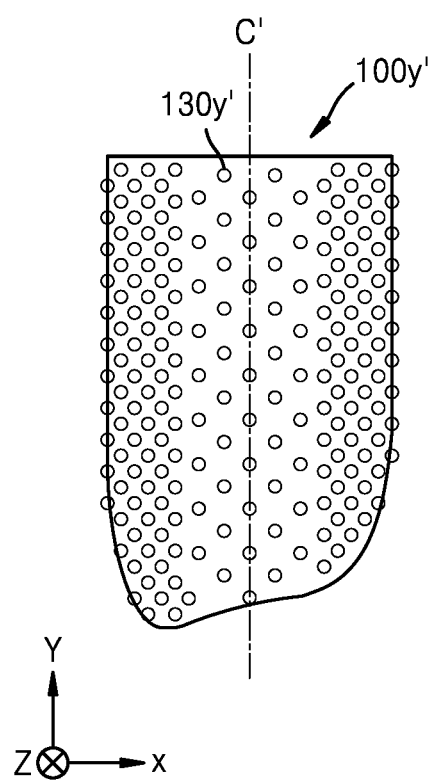

FIG. 3 is a diagram illustrating a wear process for dicing blades 100$a'$ according to a comparative example. Furthermore, FIGS. 4A and 4B are diagrams illustrating cross-sections of dicing blades 100$x'$ and 100$y'$ according to comparative examples.

Referring to FIG. 3, the dicing blade 100$a'$ according to the comparative example may include diamond particles 130$a'$ having a uniform density at a central portion and an edge portion or peripheral portion thereof. In other words, a density of the diamond particles 130$a'$ in the central portion of the dicing blade 100$a'$ may be substantially the same as a density of the diamond particles 130$a'$ in the edge portion or peripheral portion thereof.

In a process of individualizing a semiconductor device by using the dicing blade 100$a'$ according to the comparative example, stress may concentrate on the edge portion or peripheral portion of the dicing blade 100$a'$. Accordingly, when the dicing blade 100$a'$ is used repeatedly, the edge portion or peripheral portion of the dicing blade 100$a'$ may wear down faster than the central portion thereof.

When an edge portion or peripheral portion of a dicing blade 100$b'$ is worn, a central portion of the dicing blade 100$b'$ may convexly protrude in a direction toward the semiconductor device (S of FIG. 1). When the dicing blade 100$b'$ with the worn edge portion or peripheral portion is repeatedly used, the central portion of the dicing blade 100$b'$ may wear faster than the edge portion or peripheral portion thereof.

Referring to a dicing blade 100$c'$ with an edge portion (e.g., a peripheral portion) and a central portion sequentially worn, lengths of the dicing blade 100$c'$ in the first and second directions X and Y may be respectively different from lengths of the original dicing blade 100$a'$ in the first and second directions X and Y.

Accordingly, when the dicing blades 100$a'$, 100$b'$, and 100$c'$ are repeatedly used, sizes of semiconductor devices individualized using the dicing blades 100$a'$, 100$b'$, and 100$c'$ may differ from one another.

Referring to FIGS. 4A and 4B together, the dicing blades 100$x'$ and 100$y'$ according to the comparative examples may respectively include diamond particles 130$x'$ and 130$y'$, and each dicing blade has a higher density of the diamond particles 130$x'$ and 130$y'$ at an edge portion than at a central portion. Because the dicing blades 100$x'$ and 100$y'$ may respectively include the diamond particles 130$x'$ and 130$y'$, each having a higher density at an edge portion than at a central portion, the edge portion of each of the dicing blades 100x' and 100y' may have a higher stiffness than that of a central portion thereof.

However, when there is a large stiffness difference between the central and edge portions of each of the dicing blades 100x' and 100y', wear may proceed faster at the central portion of each of the dicing blades 100x' and 100y' than at the edge portion thereof.

Accordingly, as shown in FIG. 4A, a lower portion of the dicing blade 100x' may be formed to have a W shape. For example, the central portion of the dicing blade 100x' may protrude inward. When the lower portion of the dicing blade 100x' is provided in a W shape, the cutting capability of the central portion of the dicing blade 100x' may be reduced.

In addition, as shown in FIG. 4B, when the dicing blade 100y' includes the diamond particles 130y' with a higher density at the edge portion than at a central portion thereof, uneven wear of the dicing blade 100y' may occur. In other words, the shape of the lower portion of the dicing blade 100y' may be asymmetric about a central axis C' extending in the second direction Y. Accordingly, a cutting capability of the dicing blade 100y' may be reduced, and semiconductor devices individualized using the dicing blade 100y' may have different sizes.

To prevent the above-described uneven wear of a dicing blade, the dicing blade 100 according to an exemplary embodiment of the present inventive concept described with reference to FIG. 1 may be provided.

According to an exemplary embodiment of the present inventive concept, because the dicing blade 100 may include diamond particles that have a higher density at the edge portion (e.g., peripheral portion) of the dicing blade 100 than at the central portion of the dicing blade 100, the durability and cutting capability of the edge portion of the dicing blade 100 may be increased.

In addition, according to an exemplary embodiment of the present inventive concept, because the dicing blade 100 may include the metal particles 350 configured to increase durability of the central portion, wear of the central portion of the dicing blade 100 may be reduced during a process of individualizing a semiconductor device by using the dicing blade 100.

Figure 5:
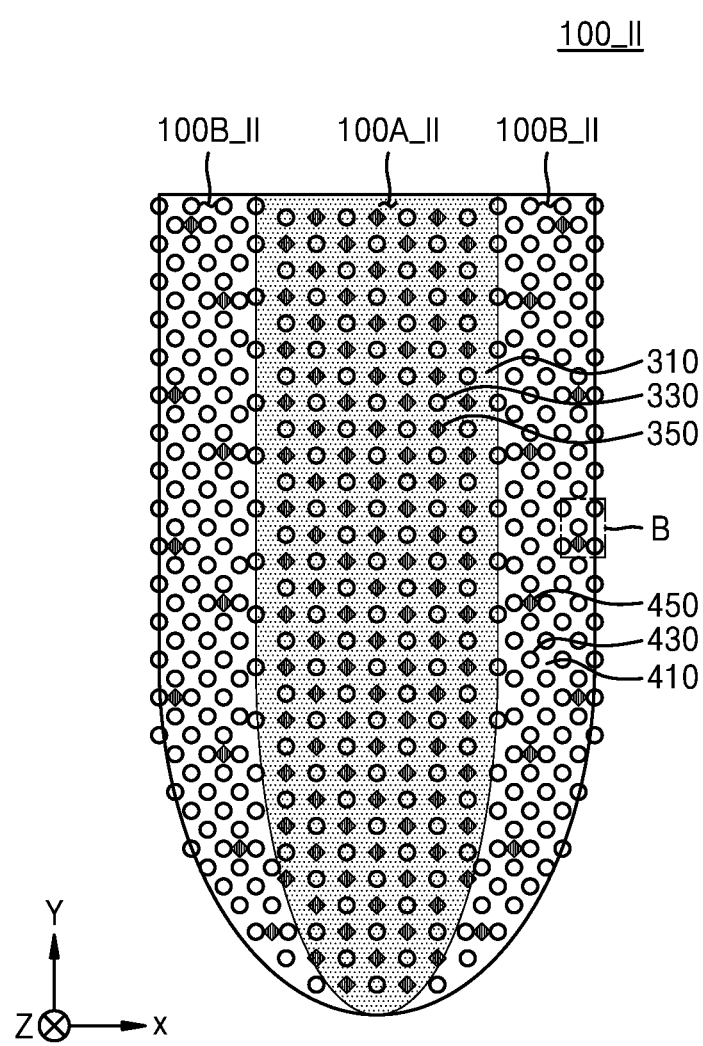
FIG. 5 is a cross-sectional view of a dicing blade according to an exemplary embodiment of the present inventive concept.

FIG. 5 is a cross-sectional view of a dicing blade 100_II according to an exemplary embodiment of the present inventive concept.

In an exemplary embodiment of the present inventive concept, the dicing blade 100_II may include a first blade portion 100A_II and a second blade portion 100B_II at least partially surrounding the first blade portion 100A_II.

The first blade portion 100A_II may include a first bonding layer 310, first diamond particles 330, and first metal particles 350. In addition, the second blade portion 100B_II may include a second bonding layer 410, second diamond particles 430, and second metal particles 450.

Hereinafter, descriptions already provided above with respect to the dicing blade 100 of FIG. 2 may be omitted, and differences from the dicing blade 100 of FIG. 2 are mainly described.

The second metal particles 450 may be particles of a metal material configured to increase the durability of the second bonding layer 410. In an exemplary embodiment of the present inventive concept, the second metal particles 450 may include at least one of Ni, Ti, and/or W. For example, materials of the second metal particles 450 may be substantially the same as those of the first metal particles 350. However, the present inventive concept is not limited thereto.

In an exemplary embodiment of the present inventive concept, the density of the second metal particles 450 in the second bonding layer 410 may be lower than the density of the first metal particles 350 in the first bonding layer 310. For example, a degree of concentration of the second metal particles 450 in the second bonding layer 410 may be lower than a degree of concentration of the first metal particles 350 in the first bonding layer 310.

For example, a distance created between adjacent ones of the second metal particles 450 in the second bonding layer 410 may be greater than a distance created between adjacent ones of the first metal particles 350 in the first bonding layer 310.

Furthermore, a volume proportion occupied by the second metal particles 450 in the second bonding layer 410 may be less than a volume proportion occupied by the first metal particles 350 in the first bonding layer 310.

As the second metal particles 450 are arranged in the second bonding layer 410, durability of the second blade portion 100B_II may be increased. For example, due to increased durability of the second blade portion 100B_II, wear of edges of the dicing blade 100_II may be reduced.

In an exemplary embodiment of the present inventive concept, the volume proportion occupied by the second metal particles 450 in the second bonding layer 410 may be about 5% to about 25%. However, the volume proportion occupied by the second metal particles 450 is not limited to the above-described numerical values.

Figure 6:
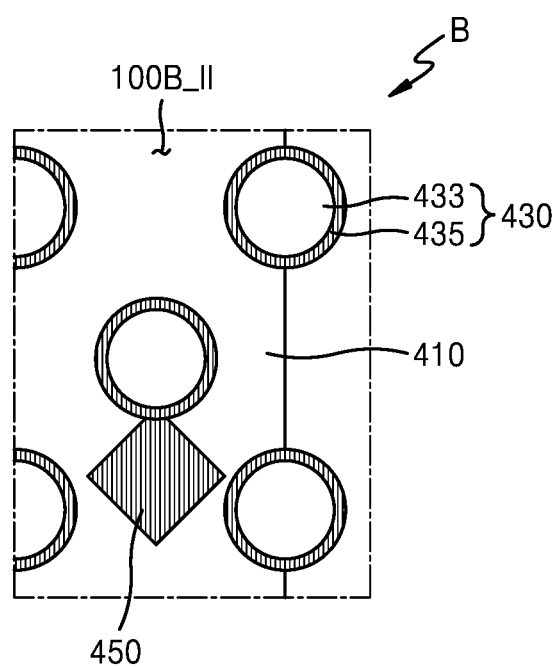
FIG. 6 is an enlarged view of an area B in FIG. 5.

FIG. 6 is an enlarged view of an area B in FIG. 5.

Referring to FIG. 6, each of the second diamond particles 430 may include a second diamond core layer 433 and a second metal coating layer 435 covering a surface of the second diamond core layer 433. For example, the second metal coating layer 435 may surround the second diamond core layer 433.

In an exemplary embodiment of the present inventive concept, a material of the second diamond core layer 433 may include a diamond. In addition, the second diamond core layer 433 may be provided in a spherical shape.

In an exemplary embodiment of the present inventive concept, materials of the second metal coating layer 435 covering the surface of the second diamond core layer 433 may be substantially the same as those of the second bonding layer 410. For example, the materials of the second metal coating layer 435 may include at least one of C, O, Cu, and/or Sn.

Because the materials of the second metal coating layer 435 of each second diamond particle 430 may be the same as those of the second bonding layer 410, a bonding strength between the second diamond particle 430 and the second bonding layer 410 may be increased. Accordingly, durability of the dicing blade 100_II including the second diamond particles 430 may be increased.

Furthermore, the materials of the second metal coating layer 435 may be substantially the same as those of each of the second metal particles 450. For example, the materials of the second metal coating layer 435 may include at least one of Ni, Ti, and/or W.

In an exemplary embodiment of the present inventive concept, when materials of each second metal particle 450 include Ni, the materials of the second metal coating layer 435 may also include Ni.

Because the materials of the second metal coating layer 435 of the second diamond particle 430 may be the same as those of the second metal particle 450, a bonding strength between the second diamond particle 430 and the second metal particle 450 may be increased. Accordingly, durability of the dicing blade 100_II including the second diamond particles 430 may be increased.

Although not shown in FIG. 6, each of the first diamond particles 330 may include a first diamond core layer and a first metal coating layer covering a surface of the first diamond core layer. Because technical ideas related to the first diamond core layer 333 and the first metal coating layer 335 are substantially the same as those related to the second diamond core layer 433 and the second metal coating layer 435, detailed descriptions thereof are omitted.

Figure 7:
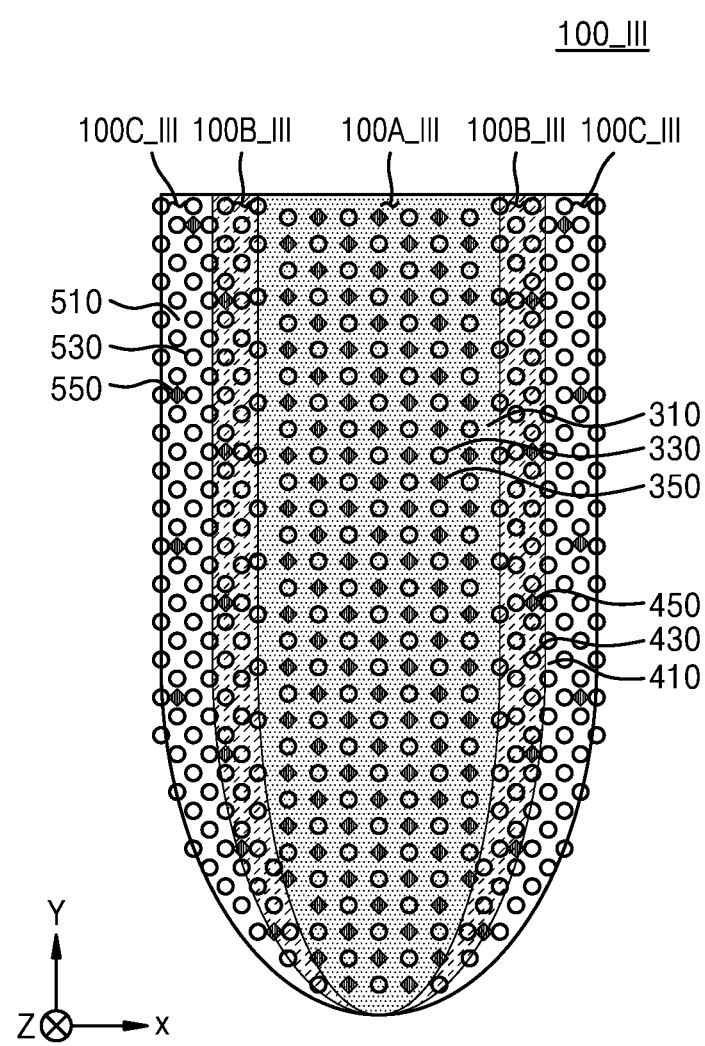
FIG. 7 is a cross-sectional view of a dicing blade according to an exemplary embodiment of the present inventive concept.

FIG. 7 is a cross-sectional view of a dicing blade 100_III according to an exemplary embodiment of the present inventive concept.

Referring to FIG. 7, according to an exemplary embodiment of the present inventive concept, the dicing blade 100_III may include a first blade portion 100A_III, a second blade portion 100B_III at least partially surrounding the first blade portion 100_III, and a third blade portion 100C_III at least partially surrounding the second blade portion 100B_III.

Hereinafter, descriptions already provided above with respect to the dicing blade 100_II of FIG. 5 are omitted, and differences from the dicing blade 100_II of FIG. 5 are mainly described.

The third blade portion 100C_III may include a third bonding layer 510, third diamond particles 530, and third metal particles 550.

In an exemplary embodiment of the present inventive concept, the density of the third diamond particles 530 in the third bonding layer 510 may be higher than the density of the second diamond particles 430 in the second bonding layer 410. For example, a distance created between adjacent ones of the third diamond particles 530 in the third bonding layer 510 may be less than a distance created between adjacent ones of the second diamond particles 430 in the second bonding layer 410. Furthermore, a volume proportion occupied by the third diamond particles 530 in the third bonding layer 510 may be greater than a volume proportion occupied by the second diamond particles 430 in the second bonding layer 410.

For example, densities of the first through third diamond particles 330, 430, and 530 may increase from a central portion of the dicing blade 100 toward an edge portion (or, e.g., peripheral portion) thereof.

In an exemplary embodiment of the present inventive concept, the density of the third metal particles 550 in the third bonding layer 510 may be lower than the density of second metal particles 450 in the second bonding layer 410. In other words, a distance created between adjacent ones of the third metal particles 550 in the third bonding layer 510 may be greater than a distance created between adjacent ones of the second metal particles 450 in the second bonding layer 410. Furthermore, a volume proportion occupied by the third metal particles 550 in the third bonding layer 510 may be less than a volume proportion occupied by the second metal particles 450 in the second bonding layer 410.

In other words, densities of the first through third metal particles 350, 450, and 550 may decrease from the central portion of the dicing blade 100_III toward the edge portion thereof.

Figure 8:
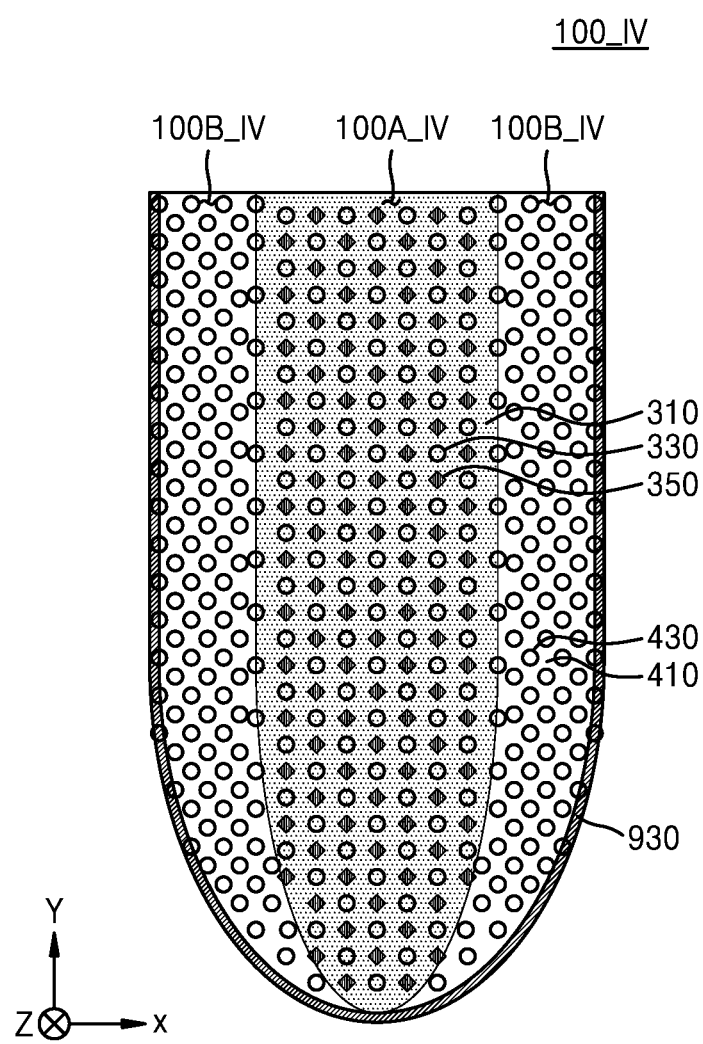
FIG. 8 is a cross-sectional view of a dicing blade according to an exemplary embodiment of the present inventive concept.

FIG. 8 is a cross-sectional view of a dicing blade 100_IV according to an exemplary embodiment of the present inventive concept. Hereinafter, descriptions already provided above with respect to the dicing blade 100_II of FIG. 5 are omitted, and differences from the dicing blade 100_II of FIG. 5 are mainly described.

According to an exemplary embodiment of the present inventive concept, the dicing blade 100_IV may further include a blade coating layer 930 covering a surface of the dicing blade 100_IV. In an exemplary embodiment of the present inventive concept, the blade coating layer 930 may be a layer of a metal material covering the surface of a second blade portion 100B_IV. For example, the blade coating layer 930 may cover at least a portion of the first blade portion 100A_IV.

In an exemplary embodiment of the present inventive concept, materials of the blade coating layer 930 may include at least one of materials constituting a second bonding layer 410 of a second blade portion 100B_IV. For example, when the second bonding layer 410 includes C, O, Cu, and/or Sn, the blade coating layer 930 may include at least one of Cu and/or Sn.

Because the materials of the blade coating layer 930 may be substantially the same as some of the materials constituting the second bonding layer 410, a bonding strength between the blade coating layer 930 and the second bonding layer 410 may be increased.

However, exemplary embodiments of the present inventive concept are not limited thereto, and the materials of the blade coating layer 930 may include at least one of Ni, Ti, and/or W.

According to an exemplary embodiment of the present inventive concept, because the dicing blade 100_IV may include the blade coating layer 930 covering the surface of the second bonding layer 410, durability and cutting capability of the dicing blade 100_IV may be increased.

Figure 9:
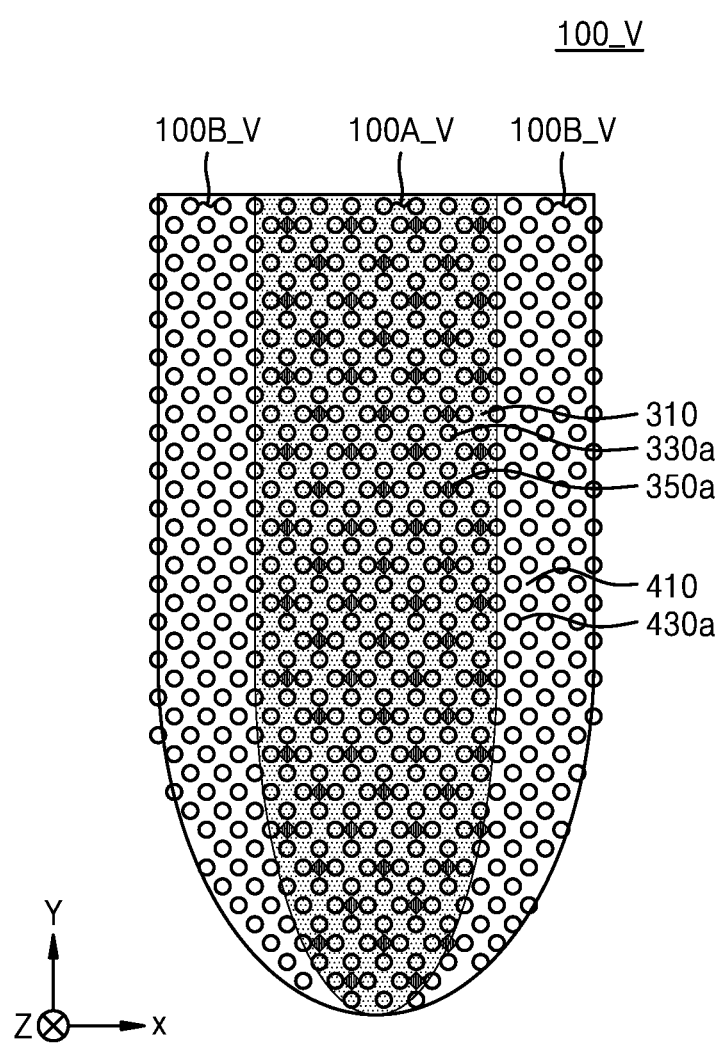
FIG. 9 is a cross-sectional view of a dicing blade according to an exemplary embodiment of the present inventive concept.

FIG. 9 is a cross-sectional view of a dicing blade 100_V according to an exemplary embodiment of the present inventive concept.

Hereinafter, descriptions already provided above with respect to the dicing blade 100 of FIG. 2 are omitted, and differences from the dicing blade 100 of FIG. 2 are mainly described.

According to an exemplary embodiment of the present inventive concept, the dicing blade 100_V may include a first blade portion 100A_V and a second blade portion 100B_V at least partially surrounding the first blade portion 100A_V.

The first blade portion 100A_V may include a first bonding layer 310, first diamond particles 330a, and metal particles 350a, and the second blade portion 100B_V may include a second bonding layer 410 and second diamond particles 430a.

In an exemplary embodiment of the present inventive concept, the density of the first diamond particles 330a in the first bonding layer 310 may be substantially the same as the density of the second diamond particles 430a in the second bonding layer 410. For example, a distance created between the first diamond particles 330a in the first bonding layer 310 may be substantially equal to a distance created between the second diamond particles 430a in the second bonding layer 410.

Furthermore, a volume proportion occupied by the first diamond particles 330a in the first bonding layer 310 may be substantially equal to a volume proportion occupied by the second diamond particles 430a in the second bonding layer 410. For example, the volume proportion occupied by the first diamond particles 330a in the first bonding layer 310 and the volume proportion occupied by the second diamond particles 430a in the second bonding layer 410 may each be about 5% to about 50%.

Furthermore, the first blade portion 100A_V may be arranged in the first bonding layer 310 and include the metal particles 350a configured to increase durability of the first bonding layer 310.

As the metal particles 350a are arranged in the first bonding layer 310, the durability of the first blade portion 100A_V may be increased. In other words, due to the increased durability of the first blade portion 100A_V, wear of the first blade portion 100A_V may be reduced during a process of individualizing the semiconductor device (S of FIG. 1) by using the dicing blade 100_V.

Figure 10:
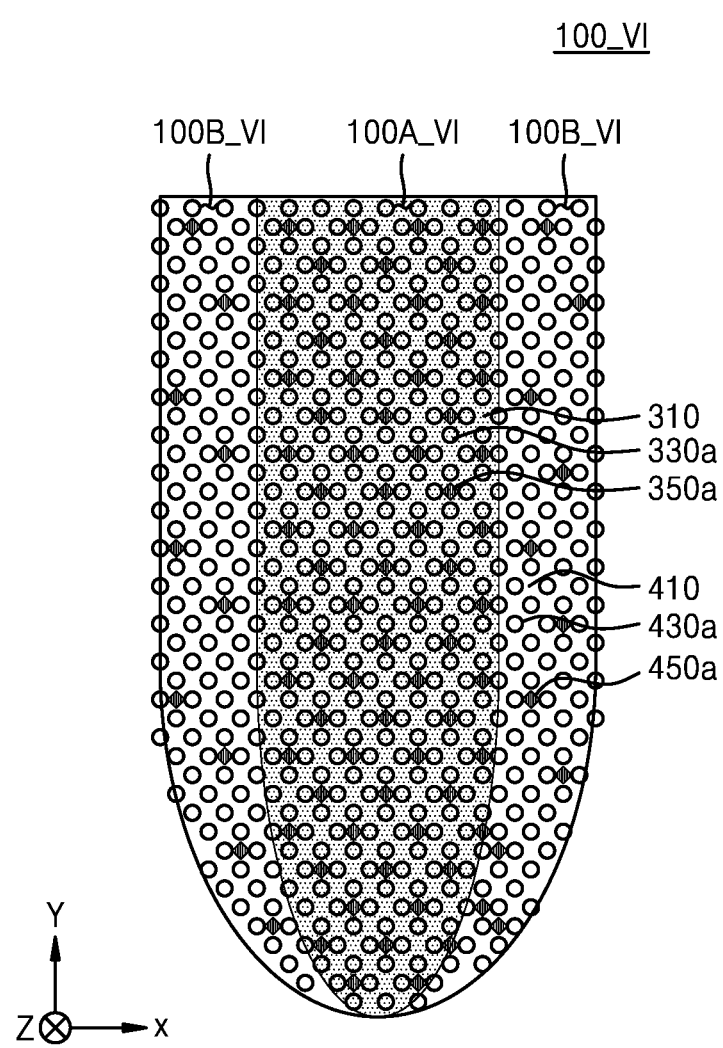
FIG. 10 is a cross-sectional view of a dicing blade according to an exemplary embodiment of the present inventive concept.

FIG. 10 is a cross-sectional view of a dicing blade 100_VI according to an exemplary embodiment of the present inventive concept.

Hereinafter, descriptions already provided above with respect to the dicing blade 100_V of FIG. 9 are omitted, and differences from the dicing blade 100_V of FIG. 9 are mainly described.

A second blade portion 100B_VI of the dicing blade 100_VI may include a second bonding layer 410, second diamond particles 430a, and second metal particles 450a.

The second metal particles 450a may be particles of a metal material configured to increase durability of the second bonding layer 410. In an exemplary embodiment of the present inventive concept, the second metal particles 450a may include at least one of Ni, Ti, and/or W. Furthermore, materials of the second metal particles 450a may be substantially the same as those of first metal particles 350a.

In an exemplary embodiment of the present inventive concept, the density of the second metal particles 450a in the second bonding layer 410 may be lower than the density of the first metal particles 350a in the first bonding layer 310. For example, a degree of concentration of the second metal particles 450a in the second bonding layer 410 may be lower than a degree of concentration of the first metal particles 350a in a first bonding layer 310.

For example, a distance created between adjacent ones of the second metal particles 450a in the second bonding layer 410 may be greater than a distance created between adjacent ones of the first metal particles 350a in the first bonding layer 310.

Furthermore, a volume proportion occupied by the second metal particles 450a in the second bonding layer 410 may be less than a volume proportion occupied by the first metal particles 350a in the first bonding layer 310.

As the second metal particles 450a are arranged in the second bonding layer 410, durability of the second blade portion 100B_VI may be increased. In other words, due to the increase in the durability of the second blade portion 100B_VI, wear of edges of the dicing blade 100_VI may be reduced.

Figure 11:
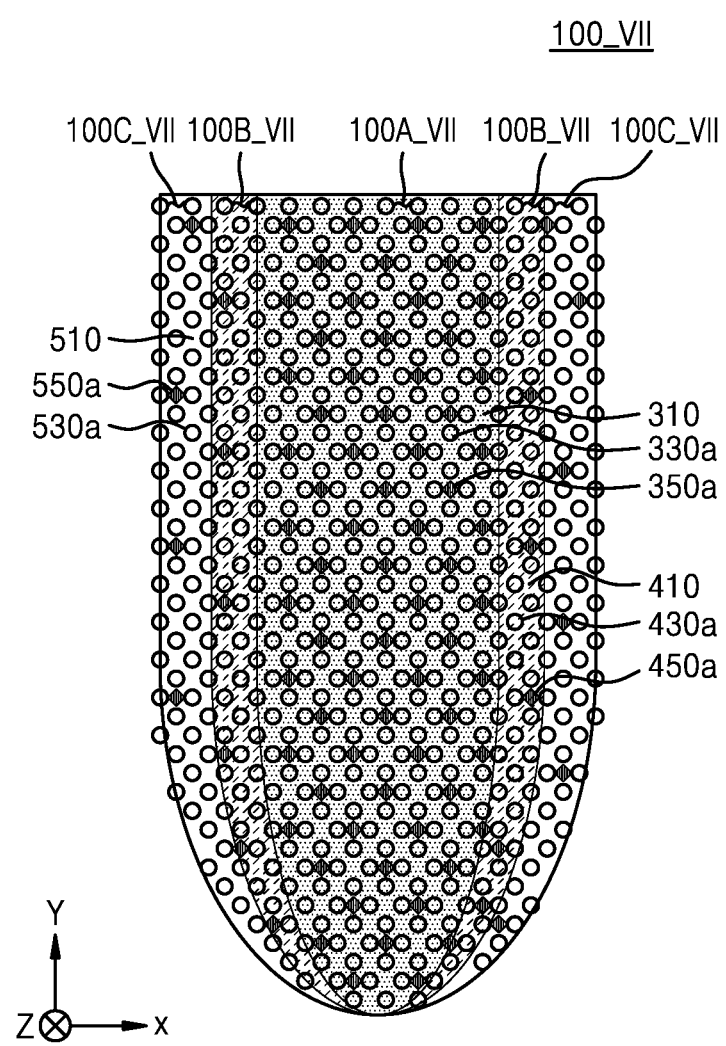
FIG. 11 is a cross-sectional view of a dicing blade according to an exemplary embodiment of the present inventive concept.

FIG. 11 is a cross-sectional view of a dicing blade 100_VII according to an exemplary embodiment of the present inventive concept.

Hereinafter, descriptions already provided above with respect to the dicing blade 100_VI of FIG. 10 are omitted, and differences from the dicing blade 100_VI of FIG. 10 are mainly described.

Referring to FIG. 11, according to an exemplary embodiment of the present inventive concept, the dicing blade 100_VII may include a first blade portion 100A_VII, a second blade portion 100B_VII at least partially surrounding the first blade portion 100A_VII, and a third blade portion 100C_VII at least partially surrounding the second blade portion 100B_VII.

The third blade portion 100C_VII may include a third bonding layer 510, third diamond particles 530a, and third metal particles 550a.

In an exemplary embodiment of the present inventive concept, the density of the third diamond particles 530a in the third bonding layer 510 may be higher than the density of second diamond particles 430a in the second bonding layer 410. In other words, a distance created between adjacent ones of the third diamond particles 530a in the third bonding layer 510 may be less than a distance created between adjacent ones of the second diamond particles 430a in a second bonding layer 410. Furthermore, a volume proportion occupied by the third diamond particles 530a in the third bonding layer 510 may be greater than a volume proportion occupied by the second diamond particles 430a in the second bonding layer 410.

In other words, densities of the first through third diamond particles 330a, 430a, and 530a may increase from a central portion of the dicing blade 100_VII toward an edge portion thereof.

In an exemplary embodiment of the present inventive concept, the density of the third metal particles 550a in the third bonding layer 510 may be lower than the density of second metal particles 450a in the second bonding layer 410. In other words, a distance created between adjacent ones of the third metal particles 550a in the third bonding layer 510 may be greater than a distance created between adjacent ones of the second metal particles 450a in the second bonding layer 410. Furthermore, a volume proportion occupied by the third metal particles 550a in the third bonding layer 510 may be less than a volume proportion occupied by the second metal particles 450a in the second bonding layer 410.

In other words, densities of the first through third metal particles 350a, 450a, and 550a may decrease from the central portion of the dicing blade 100_VII toward the edge portion thereof.

Figure 12:
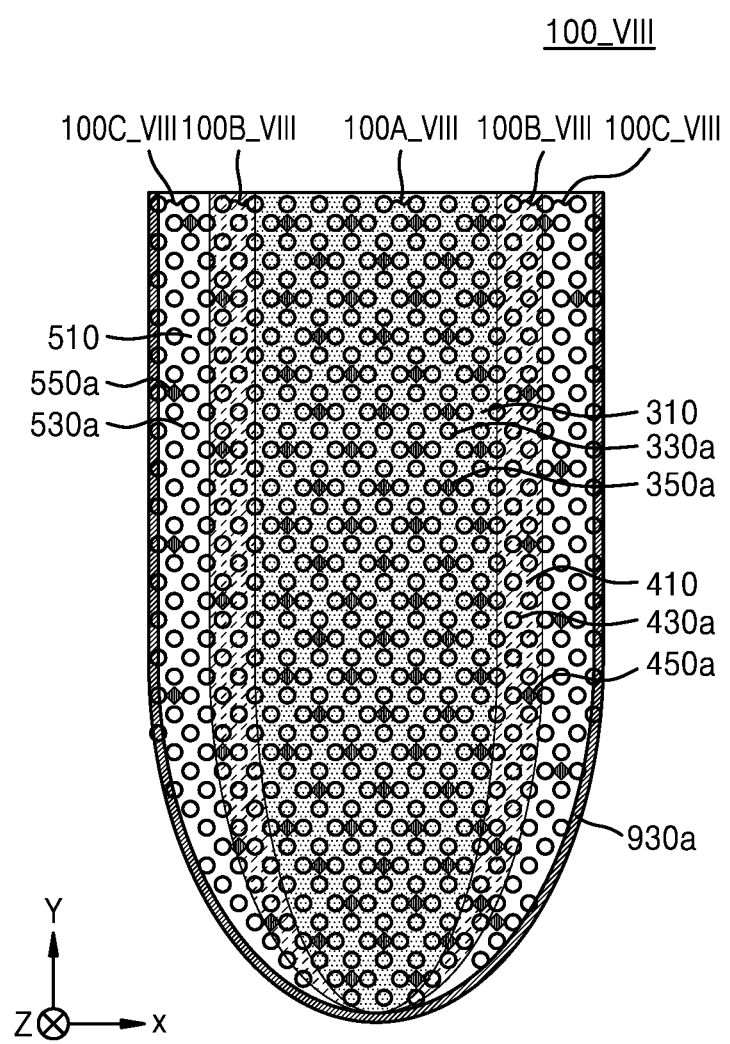
FIG. 12 is a cross-sectional view of a dicing blade according to an exemplary embodiment of the present inventive concept.

FIG. 12 is a cross-sectional view of a dicing blade 100_VIII according to an exemplary embodiment of the present inventive concept. Hereinafter, descriptions already provided above with respect to the dicing blade 100_VII of FIG. 11 are omitted, and differences from the dicing blade 100_VII of FIG. 11 are mainly described.

According to an exemplary embodiment of the present inventive concept, the dicing blade 100_VIII may further include a blade coating layer 930a covering a surface of the dicing blade 100_VIII. In an exemplary embodiment of the present inventive concept, the blade coating layer 930a may be a layer of a metal material covering the surface of a third blade portion 100C_VIII. In an exemplary embodiment of the present inventive concept, the blade coating layer 930a may cover the surface of the third blade portion 100C_VIII and portions of the first and second blade portions 100A_VIII and 100B_VIII.

In an exemplary embodiment of the present inventive concept, materials of the blade coating layer 930a may include at least one of materials constituting a third bonding layer 510 of the third blade portion 100C_VIII. For example, when the third bonding layer 510 includes C, O, Cu, and/or Sn, the blade coating layer 930a may include at least one of Cu and/or Sn.

Because the materials of the blade coating layer 930a may be substantially the same as some of the materials constituting the third bonding layer 510, a bonding strength between the blade coating layer 930a and the third bonding layer 510 may be increased.

However, exemplary embodiments of the present inventive concept are not limited thereto, and the materials of the blade coating layer 930a may include at least one of Ni, Ti, and/or W.

According to an exemplary embodiment of the present inventive concept, because the dicing blade 100_VIII may include the blade coating layer 930a covering a surface of the third bonding layer 510, durability and cutting capability of the dicing blade 100_VIII may be increased.

A method S100 of manufacturing a dicing blade according to an exemplary embodiment of the present inventive concept will now be described. For example, the method S100 of manufacturing a dicing blade according to the exemplary embodiment of the present inventive concept may be a method of manufacturing the dicing blade 100 described with reference to FIG. 2.

Figure 13:
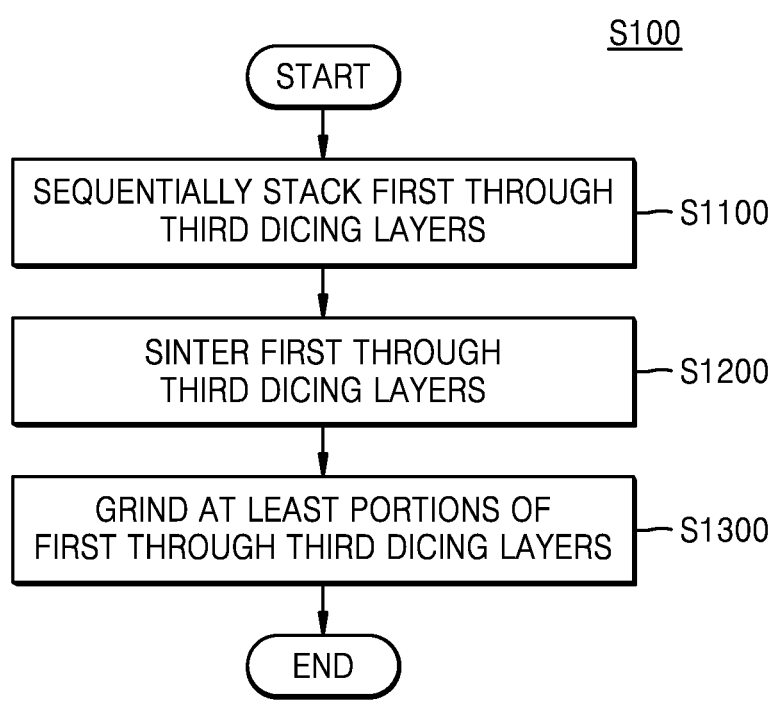
FIG. 13 is a flowchart of a method of manufacturing a dicing blade according to an exemplary embodiment of the present inventive concept.
Figure 14:
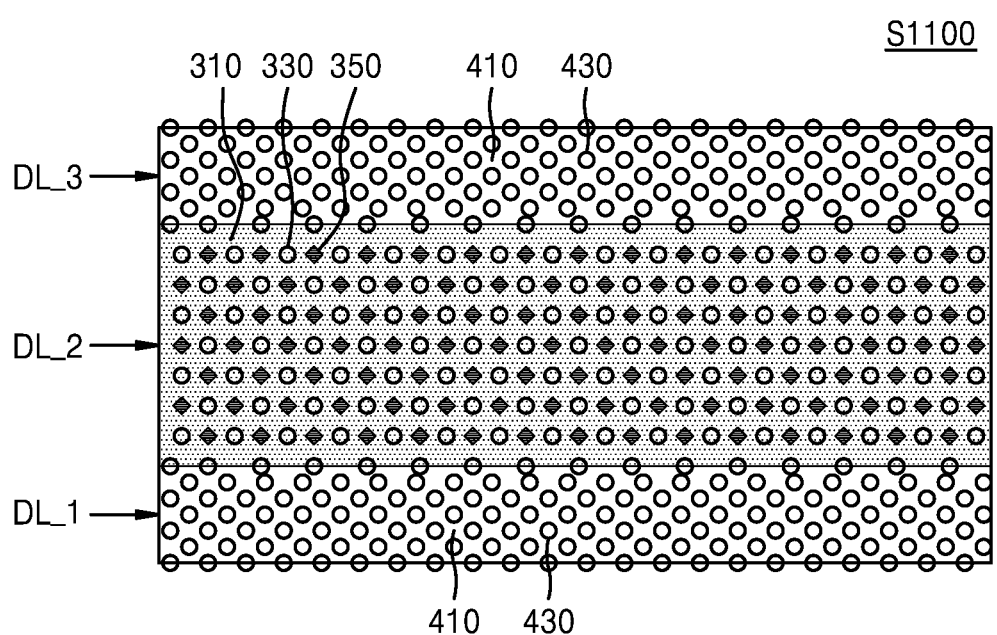
FIGS. 14, 15 and 16 are diagrams illustrating respective operations of a method of manufacturing a dicing blade according to an exemplary embodiment of the present inventive concept.
Figure 15:
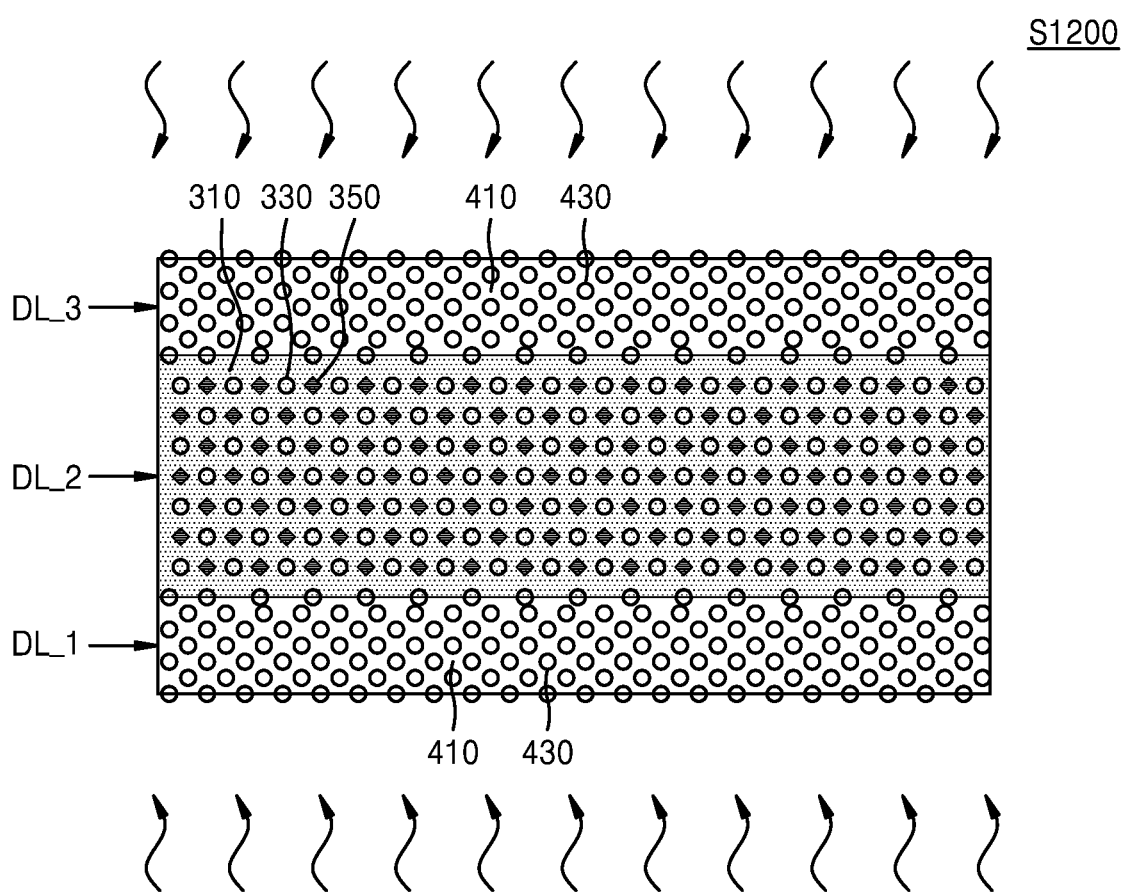
Figure 16:
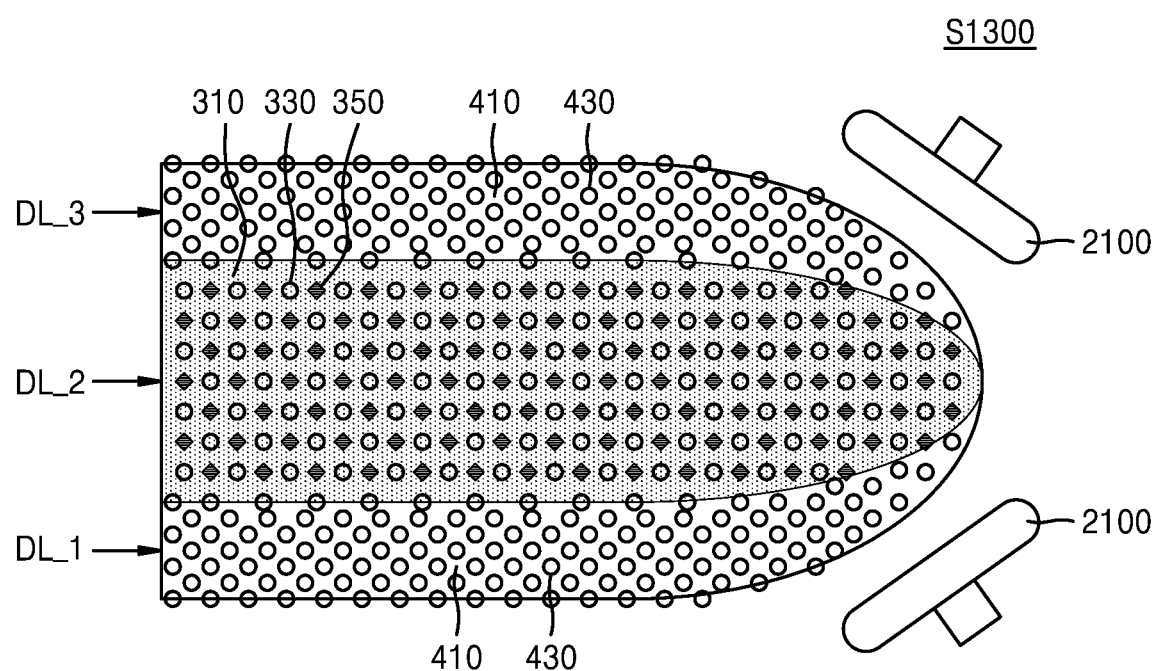

FIG. 13 is a flowchart of the method S100 of manufacturing the dicing blade (100 of FIG. 2) according to an exemplary embodiment of the inventive concept. FIGS. 14 through 16 are diagrams illustrating respective operations of the method of manufacturing the dicing blade 100 according to an exemplary embodiment of the present inventive concept.

Referring to FIG. 13, the method S100 of manufacturing the dicing blade 100 according to the exemplary embodiment of the present inventive concept may include sequentially stacking first through third dicing layers DL_1, DL_2, and DL_3 (operation S1100), sintering the first through third dicing layers DL_1 DL_2, and DL_3 (operation S1200), and grinding at least portions of the first through third dicing layers DL_1, DL_2, and DL_3 (operation S1300).

Referring to FIGS. 13 and 14 together, according to an exemplary embodiment of the present inventive concept, the method S100 of manufacturing the dicing blade 100 may include the operation (S1100) of sequentially stacking the first through third dicing layers DL_1, DL_2, and DL_3. In an exemplary embodiment of the present inventive concept, the first through third dicing layers DL_1, DL_2, and DL_3 may be a structure formed of powders or a structure formed by compressing the powders.

In an exemplary embodiment of the present inventive concept, the second dicing layer DL_2 may have a thickness greater than each of a thickness of the first dicing layer DL_1 and a thickness of the third dicing layer DL_3. For example, the thickness of the first dicing layer DL_1 may be substantially equal to the thickness of the third dicing layer DL_3. However, the present inventive concept is not limited thereto. For example, the thickness of the first dicing layer DL_1 may be different from the thickness of the third dicing layer DL_3.

In an exemplary embodiment of the present inventive concept, the sum of the thicknesses of the first through third dicing layers DL_1, DL_2, and DL_3 may range from about 150 μm to about 300 μm. However, the sum of the thicknesses of the first through third dicing layers DL_1, DL_2, and DL_3 is not limited thereto.

In operation S1100, the first dicing layer DL_1 may be at a lowermost portion of the stack structure. Furthermore, the second dicing layer DL_2 may be disposed on the first dicing layer DL_1, and the third dicing layer DL_3 may be disposed on the second dicing layer DL_2.

In an exemplary embodiment of the present inventive concept, the first dicing layer DL_1 may include the second bonding layer 410 and the second diamond particles 430 arranged in the second bonding layer 410. Because the second bonding layer 410 and the second diamond particles 430 have been described above with reference to FIG. 2, detailed descriptions thereof are omitted.

In addition, the second dicing layer DL_2 may include the first bonding layer 310, the first diamond particles 330, and metal particles 350. The first bonding layer 310 is disposed on the second bonding layer 410 of the first dicing layer DL_1, and the first diamond particles 330 and the metal particles 350 are arranged in the first bonding layer 310. Because the first bonding layer 310, the first diamond particles 330, and the metal particles 350 have been described above with reference to FIG. 2, detailed descriptions thereof are omitted.

In addition, the third dicing layer DL_3 may include the second bonding layer 410 and second diamond particles 430. The second bonding layer 410 of the third dicing layer DL_3 is disposed on the first bonding layer 310 of the second dicing layer DL_2, and the second diamond particles 430 are arranged in the second bonding layer 410. Because the second bonding layer 410 and the second diamond particles 430 have been described above with reference to FIG. 2, detailed descriptions thereof are omitted.

In an exemplary embodiment of the present inventive concept, the second diamond particles 430 included in each of the first and third dicing layers DL_1 and DL_3 may have a higher density than that of the first diamond particles 330 included in the second dicing layer DL_2.

In other words, a distance created between the second diamond particles 430 in each of the first and third dicing layers DL_1 and DL_3 may be less than a distance created between the first diamond particles 330 in the second dicing layer DL_2.

Furthermore, a volume proportion occupied by the second diamond particles 430 in each of the first and third dicing layers DL_1 and DL_3 may be greater than a volume proportion occupied by the first diamond particles 330 in the second dicing layer DL_2.

In an exemplary embodiment of the present inventive concept, the density of the second diamond particles 430 in the first dicing layer DL_1 may be substantially equal to that of the second diamond particles 430 in the third dicing layer DL_3. Accordingly, the durability of an edge portion of the dicing blade 100, which is manufactured using the method S100, may be maintained uniformly.

In an exemplary embodiment of the present inventive concept, because the second diamond particles 430 in each of the first and third dicing layers DL_1 and DL_3 may have a higher density than that of the first diamond particles 330 in the second dicing layer DL_2, the edge portion of the dicing blade 100, which is manufactured using the method S100, may have increased durability and cutting capability.

Furthermore, because the second dicing layer DL_2 may include the metal particles 350, the central portion of the dicing blade 100, which is manufactured using the method S100, may have increased durability.

In addition, because the first diamond particles 330 in the second dicing layer DL_2 may have a lower density than that of the second diamond particles 430 in each of the first and third dicing layers DL_1 and DL_3, regenerative power of the central portion of the dicing blade 100, which is manufactured using the method S100, may be increased.

Referring to FIGS. 13 and 15 together, according to an exemplary embodiment of the present inventive concept, the method S100 of manufacturing the dicing blade 100 may include the operation (S1200) of sintering the first through third dicing layers DL_1, DL_2, and DL_3.

Operation S1200 may be an operation of sintering the first through third dicing layers DL_1, DL_2, and DL_3 and by applying heat thereto.

In an exemplary embodiment of the present inventive concept, in operation S1200, the first dicing layer DL_1 may be integrated with the second dicing layer DL_2. For example, when the first and second dicing layers DL_1 and DL_2 are heated, the second bonding layer 410 of the first dicing layer DL_1 and the first bonding layer 310 of the second dicing layer DL_2 may melt and come in close contact with each other such that they become integrated with each other. Accordingly, a bonding strength between the first and second dicing layers DL_1 and DL_2 may be increased.

In addition, in operation S1200, the second dicing layer DL_2 may be integrated with the third dicing layer DL_3. For example, when the second and third dicing layers DL_2 and DL_3 are heated, the first bonding layer 310 of the second dicing layer DL_2 and the second bonding layer 410 of the third dicing layer DL_3 may melt and come in close contact with each other such that they become integrated with each other. Accordingly, a bonding strength between the second and third dicing layers DL_2 and DL_3 may be increased.

In an exemplary embodiment of the present inventive concept, in operation S1200, the first through third dicing layers DL_1, DL_2, and DL_3 may be heated to a temperature between about 400 degrees Celsius (° C.) and about 500° C. For example, in operation S1200, the first through third dicing layers DL_1, DL_2, and DL_3 may be heated to about 450° C.

In operation S1200, when the first through third dicing layers and DL_1, DL_2, and DL_3 are heated below about 400° C., air bubbles may be generated between the first and second dicing layers DL_1 and DL_2 and between the second and third dicing layers DL_2 and DL_3.

Furthermore, in operation S1200, when the first through third dicing layers DL_1, DL_2, and DL_3 are heated above about 500° C., cracks may occur between the first and second dicing layers DL_1 and DL_2 and between the second and third dicing layers DL_2 and DL_3.

When the first through third dicing layers DL_1, DL_2, and DL_3 are heated below about 400° C. or above about 500° C., bonding strengths between the first and second dicing layers DL_1 and DL_2 and between the second and third dicing layers DL_2 and DL_3 may decrease.

Because operation S1200 may include the operation of heating the first through third dicing layers DL_1, DL_2, and DL_3 to a temperature between about 400° C. and about 500° C., the bonding strengths between the first and second dicing layers DL_1 and DL_2 and between the second and third dicing layers DL_2 and DL_3 may be increased.

Referring to FIGS. 13 and 16 together, according to an exemplary embodiment of the present inventive concept, the method S100 of manufacturing the dicing blade 100 may include the operation (S1300) of grinding at least portions of the first through third dicing layers DL_1, DL_2, and DL_3 (operation S1300).

In operation S1300, portions of the first through third dicing layers DL_1, DL_2, and DL_3 that are predetermined to come in contact with the semiconductor device (S of FIG. 1) may be ground with a grinder 2100.

In an exemplary embodiment of the present inventive concept, after operation S1300 is performed, sides of the first through third dicing layers DL_1, DL_2 and DL_3 may each have a thickness that decreases as a distance from a rotary axis of the first through third dicing layers DL_1, DL_2 and DL_3 increases. Accordingly, the dicing blade 100, which is manufactured using the method S100 according to an exemplary embodiment of the present inventive concept, may have a round cutting surface.

While the present inventive concept has been described with reference to embodiments thereof, it will be understood by those of ordinary skill in the art that various changes in form and details may be made thereto without departing from the spirit and scope of the present inventive concept.

What is claimed is:

1. A dicing blade comprising:
    a first blade portion and a second blade portion at least partially surrounding the first blade portion, wherein the first blade portion comprises:
    a first bonding layer;
    first diamond particles disposed in the first bonding layer and having a first density in the first bonding layer; and
    first metal particles disposed in the first bonding layer, and wherein the second blade portion comprises:
    a second bonding layer at least partially surrounding the first bonding layer; and
    second diamond particles disposed in the second bonding layer and having a second density in the second bonding layer, wherein the second density is higher than the first density.

2. The dicing blade of claim 1, wherein the second blade portion further comprises second metal particles arranged in the second bonding layer, and
    a volume proportion occupied by the first metal particles in the first bonding layer is greater than a volume proportion occupied by the second metal particles in the second bonding layer.

3. The dicing blade of claim 1, wherein the first metal particles have a volume proportion of about 10% to about 30% in the first bonding layer.

4. The dicing blade of claim 1, wherein each of the first metal particles includes at least one of nickel (Ni), titanium (Ti), or tungsten (W).

5. The dicing blade of claim 1, wherein each of the first and second bonding layers includes at least one of carbon (C), oxygen (O), copper (Cu), or tin (Sn).

6. The dicing blade of claim 1, wherein the second diamond particles have a first volume proportion of about 5% to about 50% in the second bonding layer, and
    the first diamond particles have a second volume proportion in a range of about 3% to about 45% in the first bonding layer, wherein the second volume proportion is less than the first volume proportion.

7. The dicing blade of claim 1, wherein each of the first diamond particles comprises:
    a first core layer including a diamond; and
    a first metal coating layer covering a surface of the first core layer, and
    each of the second diamond particles comprises:
    a second core layer including a diamond; and
    a second metal coating layer covering a surface of the second core layer.

8. The dicing blade of claim 7, wherein each of the first metal coating layers of the first diamond particles includes at least one material from among materials included in the first bonding layer and each of the first metal particles, and
    the second metal coating layer of the second diamond particle includes a same material as that of the second bonding layer.

9. The dicing blade of claim 1, wherein at least one of the first diamond particles has a portion protruding from a surface of the first bonding layer, and at least one of the second diamond particles has a portion protruding from a surface of the second bonding layer.

10. A dicing blade comprising:
a first blade portion and a second blade portion at least partially surrounding the first blade portion, wherein the first blade portion comprises:
a first bonding layer;
first diamond particles disposed in the first bonding layer; and
first metal particles disposed in the first bonding layer and having a first density in the first bonding layer, and
the second blade portion comprises:
a second bonding layer at least partially surrounding the first bonding layer; and
second diamond particles disposed in the second bonding layer.

11. The dicing blade of claim 10, wherein the second blade portion further comprises second metal particles disposed in the second bonding layer and having a second density in the second bonding layer, wherein the second density is lower than the first density.

12. The dicing blade of claim 11, wherein a first volume proportion occupied by the first diamond particles in the first bonding layer is less than a second volume proportion occupied by the second diamond particles in the second bonding layer.

13. The dicing blade of claim 11, wherein each of the first and second metal particles includes at least one of carbon (C), oxygen (O), copper (Cu), or tin (Sn).

14. The dicing blade of claim 12, further comprising a third blade portion at least partially surrounding the second blade portion, wherein
the third blade portion comprises:
a third bonding layer at least partially surrounding the second bonding layer;
third diamond particles disposed in the third bonding layer; and
third metal particles disposed in the third bonding layer and having a third density in the third bonding layer, wherein the third density is lower than the second density.

15. The dicing blade of claim 14, wherein the second volume proportion occupied by the second diamond particles in the second bonding layer is less than a third volume proportion occupied by the third diamond particles in the third bonding layer.

16. The dicing blade of claim 10, wherein each of the first and second bonding layers includes at least one of carbon (C), oxygen (O), copper (Cu), or tin (Sn).

17. A dicing blade comprising:
a first blade portion and a second blade portion at least partially surrounding the first blade portion, wherein the first blade portion comprises:
a first bonding layer including at least one of carbon (C), oxygen (O), copper (Cu), or tin (Sn);
first metal particles having a first density in the first bonding layer, wherein each of the first metal particles includes at least one of nickel (Ni), titanium (Ti), or tungsten (W); and
first diamond particles disposed in the first bonding layer and having a second density in the first bonding layer, and
the second blade portion comprises:
a second bonding layer at least partially surrounding the first bonding layer and including at least one of C, O, Cu, or Sn;
second metal particles having a third density in the second bonding layer, wherein the third density is lower than the first density, wherein each of the second metal particles includes at least one of Ni, Ti, or W; and
second diamond particles disposed in the second bonding layer and having a fourth density higher in the second bonding layer, wherein the fourth density is lower than the second density.

18. The dicing blade of claim 17, further comprising a third blade portion at least partially surrounding the second blade portion, wherein
the third blade portion comprises:
a third bonding layer at least partially surrounding the second bonding layer and including at least one of C, O, Cu, or Sn;
third metal particles having a fifth density in the third bonding layer, wherein the fifth density is lower than the third density, wherein each of the third metal particles includes at least one of Ni, Ti, or W; and
third diamond particles disposed in the third bonding layer and having a sixth density in the third bonding layer, wherein the sixth density is higher than the fourth density.

19. The dicing blade of claim 17, wherein each of the first diamond particles comprises:
a first core layer including a diamond; and
a first metal coating layer covering a surface of the first core layer,
wherein each of the second diamond particles comprises:
a second core layer including a diamond; and
a second metal coating layer covering a surface of the second core layer,
wherein the first metal coating layer includes at least one material from among materials included in the first bonding layer and each of the first metal particles, and
the second metal coating layer includes at least one material from among materials included in the second bonding layer and each of the second metal particles.

20. The dicing blade of claim 17, further comprising a blade coating layer covering a surface of the second bonding layer.

* * * * *